United States Patent
Yun et al.

(10) Patent No.: US 8,582,471 B2
(45) Date of Patent: Nov. 12, 2013

(54) WIRELESS AD-HOC NETWORK CONFIGURATION METHOD AND APPARATUS

(75) Inventors: Suk-Jin Yun, Seoul (KR); Chang-Yeul Kwon, Yongin-si (KR); Seong-Wook Lee, Yongin-si (KR); Chil-Youl Yang, Seoul (KR); Kyung-Ik Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 12/922,579

(22) PCT Filed: Mar. 11, 2009

(86) PCT No.: PCT/KR2009/001197
§ 371 (c)(1),
(2), (4) Date: Oct. 12, 2010

(87) PCT Pub. No.: WO2009/113801
PCT Pub. Date: Sep. 17, 2009

(65) Prior Publication Data
US 2011/0044208 A1    Feb. 24, 2011

Related U.S. Application Data

(60) Provisional application No. 61/036,507, filed on Mar. 14, 2008.

(51) Int. Cl.
*H04L 12/28* (2006.01)
*H04L 9/32* (2006.01)
*H04L 29/06* (2006.01)
*H04L 12/00* (2006.01)
*G06F 7/04* (2006.01)

(52) U.S. Cl.
USPC ............ 370/254; 713/168; 713/171; 726/3; 726/4; 726/6; 709/228

(58) Field of Classification Search
USPC ................. 370/254; 713/168, 171; 726/3–7; 709/228
See application file for complete search history.

(56) References Cited

U.S. PATENT DOCUMENTS

| | | | |
|---|---|---|---|
| 8,233,456 B1* | 7/2012 | Kopikare et al. | 370/332 |
| 2006/0239208 A1* | 10/2006 | Roberts et al. | 370/254 |
| 2007/0198675 A1* | 8/2007 | Amanuddin et al. | 709/223 |
| 2008/0037444 A1 | 2/2008 | Chhabra | |
| 2008/0089300 A1* | 4/2008 | Yee | 370/338 |
| 2008/0109551 A1* | 5/2008 | Sim et al. | 709/228 |

FOREIGN PATENT DOCUMENTS

| | | |
|---|---|---|
| KR | 10-2006-0098360 A | 9/2006 |
| KR | 10-2007-0110222 A | 11/2007 |

OTHER PUBLICATIONS

Wi-Fi Alliance, "Wi-Fi Protected Setup Specification", Wi-Fi Alliance Confidential, Version 1.0h, Dec. 2006, pp. 1-110.

* cited by examiner

*Primary Examiner* — Hoon J Chung
*Assistant Examiner* — Yaotang Wang
(74) *Attorney, Agent, or Firm* — Sughrue Mion, PLLC (57) ABSTRACT

A method and apparatus for setting up a wireless ad-hoc network, the method including: interchanging, at a terminal, a terminal identifier and Wi-Fi protected setup (WPS) capability information with another terminal of the wireless ad-hoc network; selecting, at the terminal, a role of the terminal as a registrar or an enrollee based on the interchanged terminal identifier and the interchanged WPS capability information of the wireless ad-hoc network; and optionally registering in the registrar based on the selected role.

31 Claims, 4 Drawing Sheets

| WPS CAPABILITY INFORMATION VALUE | DESCRIPTION |
|---|---|
| 0x00 | Reserved |
| 0x01 | Enrollee Capability Only |
| 0x02 | Registrar Capability Only |
| 0x03 | Enrolee & Registrar Capability |

WIRELESS AD-HOC NETWORK CONFIGURATION METHOD AND APPARATUS

CROSS-REFERENCE TO RELATED APPLICATIONS

This application is a National Stage application under 35 U.S.C. §371 of PCT/KR2009/001197 filed on Mar. 11, 2009, which claims the benefit of U.S. Provisional Patent Application No. 61/036,507, filed on Mar. 14, 2008, all the disclosures of which are incorporated herein in their entireties by reference.

BACKGROUND

1. Field

Exemplary embodiments relate to a method and apparatus for easily and safely setting up a wireless ad-hoc network by extending a Wi-Fi protected setup (WPS) protocol.

2. Description of the Related Art

Wi-Fi protected setup (WPS) has been suggested by the WiFi alliance as a standard for easily and safely installing a wireless home network. The purpose of WPS is to simplify a process of connecting a home device to a wireless network and to protect a home network from external attacks.

WPS architecture that supports an infrastructure mode network includes an access point (AP), a registrar, and an enrollee.

The registrar manages a credential of a WPS protocol and safely distributes the credential to stations that participate as enrollees in a network managed by the registrar. The WPS architecture includes an internal type WPS architecture and an external type WPS architecture, which are distinguished from each other depending on whether the registrar is implemented inside or outside the AP.

The credential is a data structure including a service set identifier (SSID), a channel, a key, etc., which are issued by the registrar to the enrollee. When the WPS protocol operates normally, the enrollee can participate in the network by using the credential issued by the registrar. The enrollee is a terminal that participates in a wireless network.

In the WPS architecture that supports the infrastructure mode network, all terminals play a predetermined role, i.e., serve as a registrar or an enrollee. Thus, in a push button configuration method that is a WPS architecture model, a terminal can recognize how to execute the WPS protocol. For example, a button of the AP including the registrar is a button for driving a registrar included in the AP, and buttons of other terminals are buttons for driving enrollees included in the terminals.

However, in an ad-hoc mode network, any terminal may be an AP. Thus, in the ad-hoc network, it cannot be recognized in advance whether a terminal serves as a registrar or an enrollee. Thus, a method of determining which terminal serves as a registrar is needed.

SUMMARY

Exemplary embodiments provide a method and apparatus for easily and safely setting up a wireless ad-hoc network by extending a Wi-Fi protected setup (WPS) protocol. Exemplary embodiments also provide a computer readable recording medium having recorded thereon a program for executing the method.

According to an aspect of an exemplary embodiment, there is provided a method of setting up a wireless ad-hoc network, the method including: interchanging, at a terminal, a terminal identifier and Wi-Fi protected setup (WPS) capability information with another terminal of the wireless ad-hoc network; selecting, at the terminal, a role of the terminal as a registrar or an enrollee based on the interchanged terminal identifier and the interchanged WPS capability information of the wireless ad-hoc network; and optionally registering in the registrar based on the selected role.

The interchanging the terminal identifier and the Wi-Fi protected setup (WPS) capability information with the other terminal of the wireless ad-hoc network may include: transmitting a first search frame including the terminal identifier and the WPS capability information of the terminal to the other terminal of the wireless ad-hoc network; and receiving a second search frame including the terminal identifier and the WPS capability information of the other terminal from the other terminal of the wireless ad-hoc network.

The first and second search frames may be probe request frames.

The terminal identifier may be a media access control (MAC) address of the terminal.

The WPS capability information may include at least one of identification information regarding only serving as the registrar from among roles of the registrar and the enrollee, identification information regarding only serving as the enrollee from among roles of the registrar and the enrollee, and identification information regarding serving as both the registrar and the enrollee.

The method may further include generating a role selection table comprising the terminal identifier and the WPS capability information of the terminal and the other terminal, which are interchanged with the other terminal of the wireless ad-hoc network.

When the WPS capability information of the terminal includes the identification information regarding only serving as the enrollee, the selecting the role as the registrar or the enrollee may include selecting the terminal to have the role of the enrollee.

When the WPS capability information of the terminal includes the identification information regarding only serving as the registrar, the selecting the role as the registrar or the enrollee may include: searching the role selection table to determine whether the WPS capability information of the other terminal of the wireless ad-hoc network comprises identification information regarding only serving as a registrar; as a result of the searching, when the WPS capability information of the other terminal includes identification information regarding only serving as the registrar, comparing the terminal identifiers of the terminal and the other terminal with each other in the role selection table based on a predetermined determination criterion; and optionally selecting the terminal to have the role of the registrar based on the comparing.

As a result of the searching, when there are no other terminals of the wireless ad-hoc network including WPS capability information including identification information regarding only serving as a registrar, the selecting the role as the registrar or the enrollee may further include selecting the terminal to have the role of the registrar.

When the WPS capability information of the terminal includes the identification information regarding serving as both the registrar and the enrollee, the selecting the role as the registrar or the enrollee may include: comparing the terminal identifiers of the terminal and the other terminal with each other in the role selection table based on a predetermined determination criterion; and optionally selecting the terminal to have the role of the registrar based on the comparing.

The comparing the terminal identifiers based on the predetermined determination criterion may include aligning terminal identifiers of terminals of the wireless ad-hoc network in an ascending or descending order and determining whether the terminal identifier of the terminal has a highest priority from the aligned terminal identifiers; and the optionally selecting the terminal to have the role of the registrar may include, as a result of the determining, when the terminal identifier of the terminal has the highest priority, selecting the terminal to have the role of the registrar and when the terminal identifier of the terminal does not have the highest priority, selecting the terminal to have the role of the enrollee.

The optionally registering in the registrar based on the selected role may include: when the terminal is selected to have the role of the enrollee, receiving a credential from the other terminal of the wireless ad-hoc network selected as a registrar by using an extensible authentication protocol (EAP); and when the terminal is selected to have the role of the registrar, transmitting a credential to the other terminal of the wireless ad-hoc network selected as an enrollee by using the EAP.

According to an aspect of another exemplary embodiment, there is provided a computer readable recording medium having recorded thereon a program for executing the method.

According to an aspect of another exemplary embodiment, there is provided an apparatus of a terminal for setting up a wireless ad-hoc network, the apparatus including: an interchange unit which interchanges a terminal identifier and Wi-Fi protected setup (WPS) capability information with another terminal of the wireless ad-hoc network; a selection unit which selects a role of the terminal as a registrar or an enrollee based on the interchanged terminal identifier and the interchanged WPS capability information of the wireless ad-hoc network; and a registration unit which optionally registers in the registrar based on the selected role.

DETAILED DESCRIPTION OF EXEMPLARY EMBODIMENTS

Hereinafter, exemplary embodiments of will be described in detail with reference to the attached drawings. Like reference numerals in the drawings denote like elements. In the drawings, the sizes of elements may be exaggerated for clarity. Also, expressions such as "at least one of," when preceding a list of elements, modify the entire list of elements and do not modify the individual elements of the list.

Figure 1:
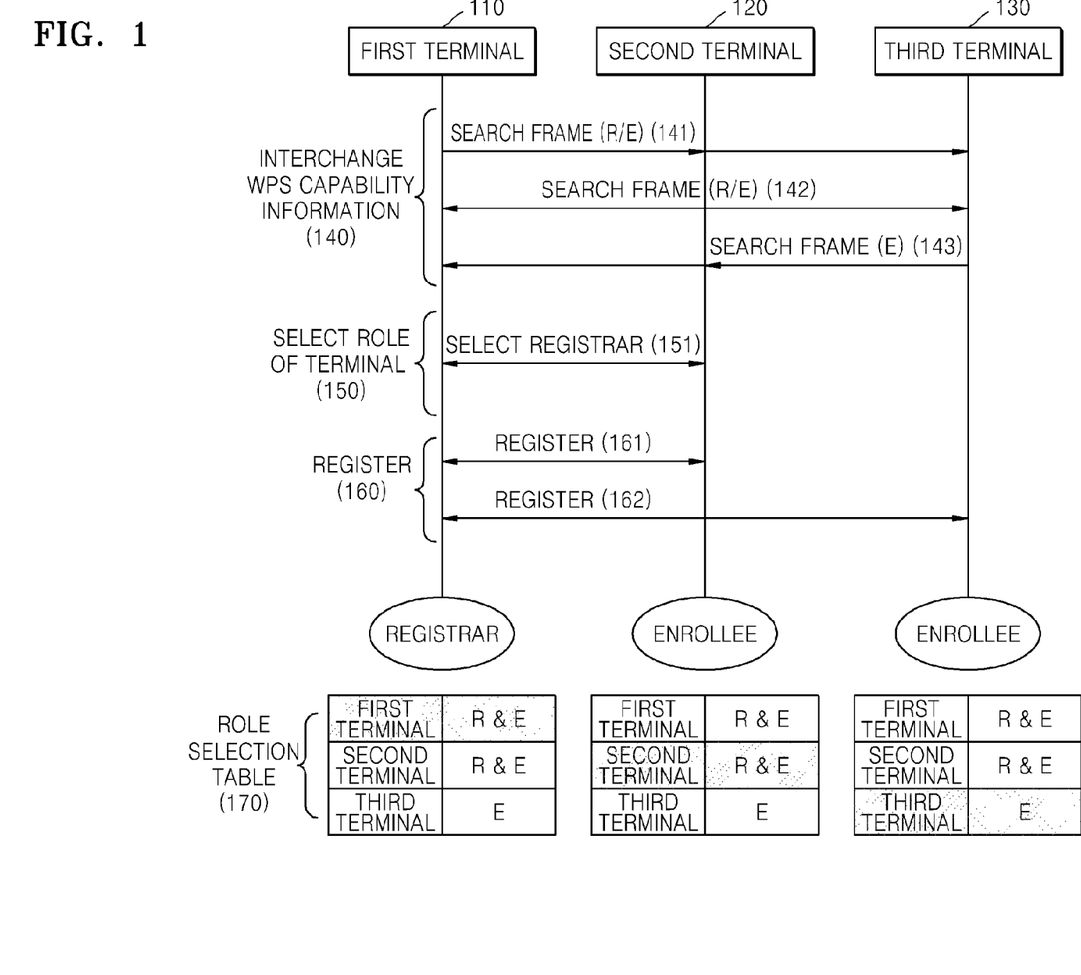
FIG. 1 is a schematic view illustrating a method of setting up a wireless ad-hoc network, according to an exemplary embodiment.

FIG. 1 is a schematic view illustrating a method of setting up a wireless ad-hoc network, according to an exemplary embodiment. In the present exemplary embodiment, terminals of the wireless ad-hoc network may include three types of terminals, such as a terminal that serves as an enrollee, a terminal that serves as a registrar, and a terminal that can serve as both an enrollee and a registrar depending on whether playing a role as an enrollee or a registrar. Information identifying the role of the terminal may be included in Wi-Fi protected setup (WPS) protocol capability information.

When the three types of terminals are present in the wireless ad-hoc network, each of the three types of terminals interchanges information about its own role with other terminals of the wireless ad-hoc network and selects its own role as a registrar or an enrollee based on the interchanged information. When a registrar has been selected in the ad-hoc network, a credential may be given by the terminal having a role selected as a registrar to each terminal that serves as an enrollee, and each terminal may participate in the ad-hoc network.

Referring to FIG. 1, in Operation 140, each of first through third terminals 110, 120, and 130 interchanges a search frame including WPS capability information with other terminals of the wireless ad-hoc network. As illustrated in FIG. 1, the first terminal 110 and the second terminal 120 transmit the WPS capability information identifying a terminal that serves as both an enrollee and a registrar to other terminals by using the search frame. The third terminal 130 transmits WPS capability information identifying a terminal that only serves as an enrollee, from among the roles of enrollee and registrar, to other terminals by using the search frame.

The search frame may include a terminal identifier as well as the WPS capability information. The terminal identifier may be a media access control (MAC) address of a terminal. In addition, the search frame may be a probe request frame. The MAC address and the probe request frame may be used as the terminal identifier and the search frame, though it is understood that another exemplary embodiment is not limited thereto, and other identifiers and other frames may be used.

In Operation 150, each of the first through third terminals 110, 120, and 130 selects a role as a registrar or an enrollee based on the interchanged terminal identifier and the interchanged WPS capability information of the wireless ad-hoc network. To this end, each of the first through third terminals 110, 120, and 130 generates a role selection table 170 including the terminal identifier and the WPS capability information, which have been interchanged with other terminals.

When each of the first through third terminals 110, 120, and 130 has its own WPS capability information including identification information regarding only serving as an enrollee, from among the roles of enrollee and registrar, each of the first through third terminals 110, 120, and 130 is selected to play the role of an enrollee. As illustrated in FIG. 1, the third terminal 130 has informed other terminals in the ad-hoc network that the third terminal 130 only serves as an enrollee through its own WPS capability information. Thus, the third terminal 130 is selected to play the role of an enrollee.

When each of the first through third terminals 110, 120, and 130 has its own WPS capability information including identification information regarding serving as both an enrollee and a registrar, terminal identifiers in the role selection table 170 are compared with each other based on a predetermined determination criterion and each of the first through third terminals 110, 120, and 130 is optionally selected to play the role of a registrar. As illustrated in FIG. 1, the first terminal 110 and the second terminal 120 have informed other terminals in the ad-hoc network that the first terminal 110 and the second terminal 120 serve as both an enrollee and a registrar through their own WPS capability information. Thus, the terminal identifiers in the role selection table 170 are compared with each other based on the predetermined determination criterion and one of the first terminal 110 and the second terminal 120 is selected as a registrar of the ad-hoc network. In the illustrated example, the first terminal 110 has been selected as a registrar.

When each of the first through third terminals 110, 120, and 130 has its own WPS capability information including identification information regarding only serving as a registrar, from among the roles of enrollee and registrar, the role selection table 170 is searched to determine whether WPS capability information of other terminals of the wireless ad-hoc network includes the identification information regarding only serving as a registrar. As a result of the searching, if it is determined that there are no other terminals having WPS capability information including identification information regarding only serving as a registrar, the role of a terminal is selected as a registrar.

As a result of the searching, if it is determined that there are other terminals having WPS capability information including identification information regarding only serving as a registrar, the terminal identifiers in the role selection table 170 are compared with each other based on the predetermined determination criterion and the role of a terminal is optionally selected as a registrar.

A detailed operation of selecting the role of a terminal will be described in detail below with reference to FIG. 4.

In Operation 160, when the registrar has been selected in the ad-hoc network, each of the second and third terminals 120 and 130 that serve as an enrollee may participate in the network with a credential given by the first terminal 110 selected as the registrar. When a role of a terminal is selected as an enrollee, such as with the second terminal 120 and the third terminal 130, a credential is received from the other terminal of the wireless ad-hoc network selected as the registrar, i.e., the first terminal 110, by using an extensible authentication protocol (EAP). Accordingly, when the first terminal 110 selects its own role as a registrar, credentials are sent to other terminals of the wireless ad-hoc network selected as an enrollee, i.e., to the second terminal 120 and the third terminal 130, by using the EAP. A security session, in which the second and third terminals 120 and 130 that serve as enrollees receive credentials from the first terminal 110 that serves as a registrar, may include eight EAP messages. The security session related to transmission and receiving of credentials is defined in the WPS standard, and thus a detailed description thereof will not be repeated here.

In an exemplary embodiment, the WPS protocol may be supported in the wireless ad-hoc network. In addition, when a terminal may determine its own role as a registrar, all terminals of the wireless ad-hoc network do not need to have a registrar function. Thus, a terminal having a small size, such as a WiFi headset, can serve only as an enrollee, from among the roles of enrollee and registrar, and flexibility may be provided when the WPS protocol is implemented.

Figure 2:
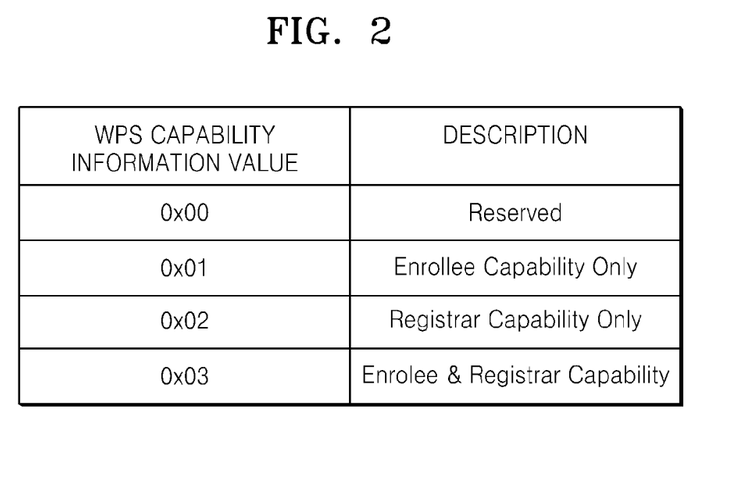
FIG. 2 is a table showing Wi-Fi protected setup (WPS) capability information values for identifying roles of terminals, according to an exemplary embodiment.

FIG. 2 shows WPS capability information values for identifying the role of a terminal, according to an exemplary embodiment. Referring to FIG. 2, terminals of a wireless ad-hoc network may include three types of terminals, such as a terminal that serves as an enrollee, a terminal that serves as a registrar, and a terminal that can serve as both an enrollee and a registrar depending on whether playing a role as an enrollee or a registrar. Information regarding identifying the role of the terminal may be included in WPS protocol capability information.

In an exemplary embodiment, the WPS protocol capability information uses a "0x01" encoding value so as to identify a terminal that only serves as an enrollee, from among the roles of enrollee and registrar. Furthermore, the WPS protocol capability information uses a "0x02" encoding value so as to identify a terminal that only serves as a registrar, from among the roles of enrollee and registrar. Also, the WPS capability information uses a "0x03" encoding value so as to identify a terminal that serves as both an enrollee and a registrar. In an exemplary embodiment, a predetermined encoding value for identifying the role of the terminal is used. However, it is understood that another exemplary embodiment is not limited thereto, and other encoding methods may be used.

Each terminal of the wireless ad-hoc network transmits WPS capability information regarding identifying its own role to other terminals by using a search frame. For example, the search frame may be a probe request frame. However, it is understood that another exemplary embodiment is not limited thereto, and other frames may be used.

Figure 3:
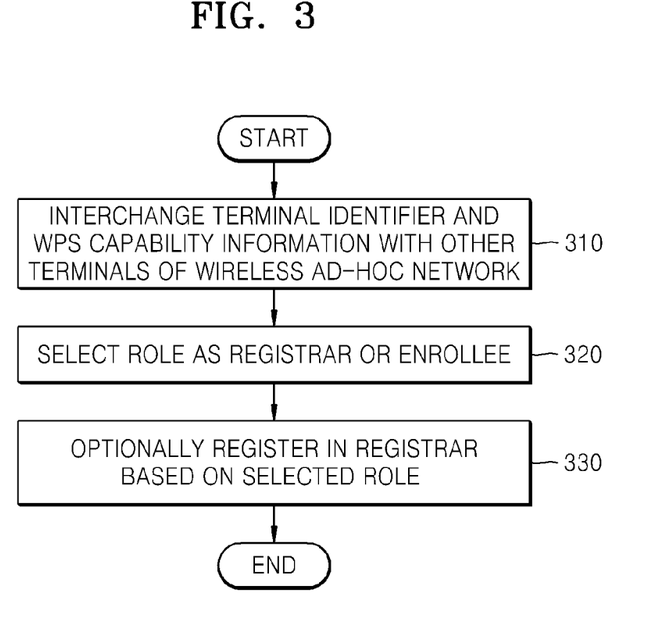
FIG. 3 is a flowchart illustrating a method of setting up a wireless ad-hoc network, according to an exemplary embodiment.

FIG. 3 is a flowchart illustrating a method of setting up a wireless ad-hoc network, according to an exemplary embodiment. Referring to FIG. 3, in Operation 310, each terminal interchanges a search frame including WPS capability information with other terminals of the wireless ad-hoc network. The search frame may include a terminal identifier as well as the WPS capability information. For example, the terminal identifier may be a MAC address of a terminal. Also, the search frame may be a probe request frame.

In detail, each terminal transmits a search frame including the terminal identifier and the WPS capability information to other terminals of the wireless ad-hoc network and receives a search frame from other terminals of the wireless ad-hoc network.

In Operation 320, each terminal selects a role as a registrar or an enrollee based on the interchanged terminal identifier and the interchanged WPS capability information of the wireless ad-hoc network. To this end, each terminal generates the role selection table 170 including the terminal identifier and the WPS capability information, which are interchanged with other terminals.

When a terminal has WPS capability information including identification information regarding only serving as an enrollee, from among the roles of enrollee and registrar, the terminal is selected to play the role of an enrollee.

When a terminal has WPS capability information including identification information regarding serving as both an enrollee and a registrar, terminal identifiers in the role selection table 170 are compared with each other based on a predetermined determination criterion and the terminal is optionally selected to play the role of a registrar.

When a terminal has WPS capability information including identification information regarding only serving as a registrar, from among the roles of enrollee and registrar, the role selection table 170 is searched to determine whether WPS capability information of other terminals of the wireless ad-hoc network includes identification information regarding only serving as a registrar. As a result of searching, when there are other terminals having WPS capability information including identification information regarding only serving as a registrar, the terminal identifiers in the role selection table 170 are compared with each other based on the predetermined determination criterion and a terminal is optionally selected to play the role of a registrar.

In Operation 330, when a registrar has been selected in the ad-hoc network, a credential may be given by the terminal selected as the registrar to each terminal that serves as an enrollee, and each terminal may participate in the ad-hoc network. When a terminal is selected to play the role of an enrollee, a credential is received from the other terminal of the wireless ad-hoc network selected as the registrar by using an EAP. When the terminal selects its own role as a registrar, credentials are sent to other terminals of the wireless ad-hoc network selected as an enrollee by using the EAP. A security session in which a terminal that serves as an enrollee receives a credential from a terminal that serves as a registrar may include eight EAP messages. The security session related to transmission and receiving of credentials is defined in the WPS standard, and thus a detailed description thereof will not be repeated here.

Figure 4:
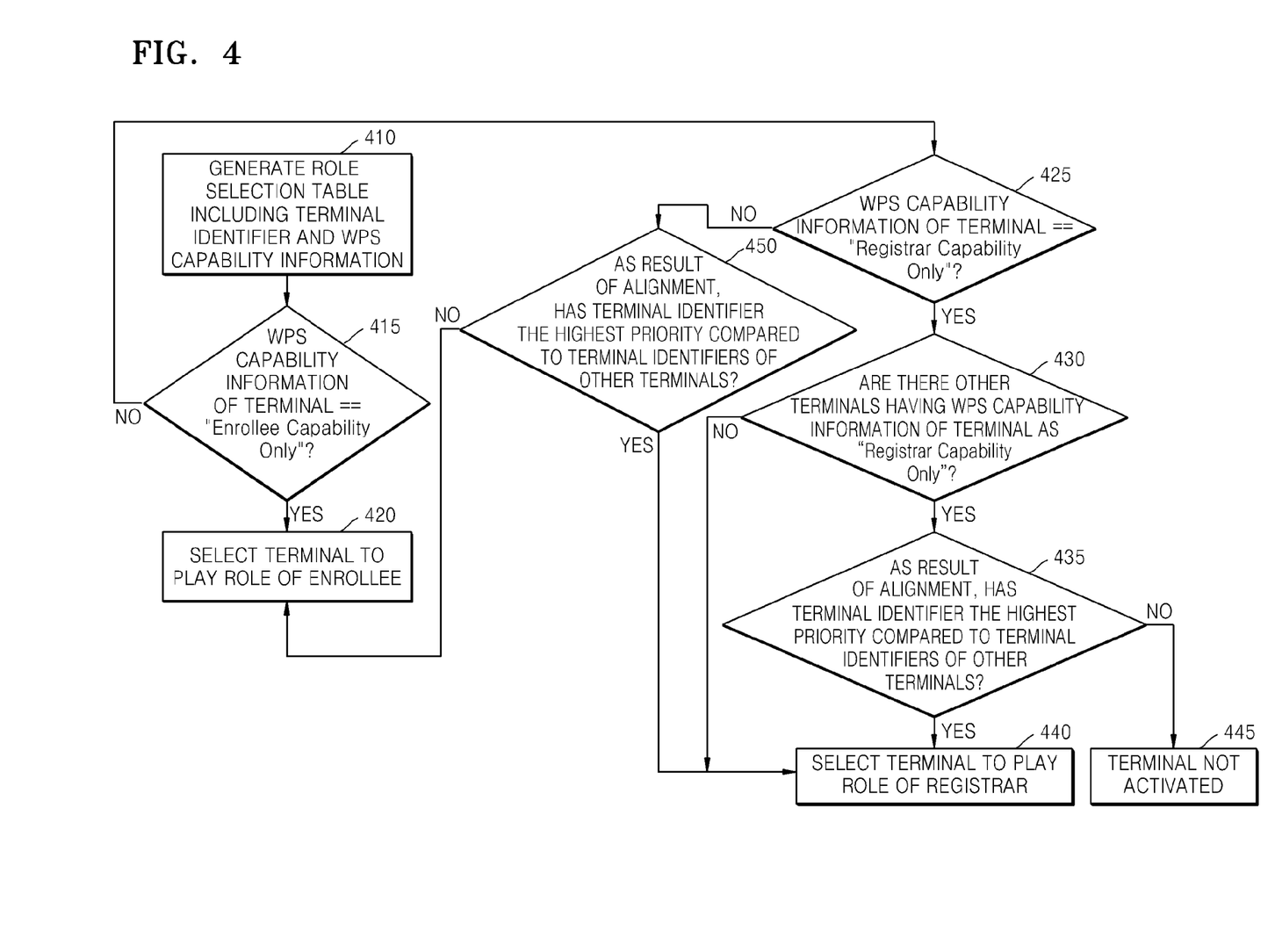
FIG. 4 is a flowchart illustrating a method of selecting a terminal to play the role of a registrar or an enrollee, according to an exemplary embodiment.

FIG. 4 is a flowchart illustrating in detail a method of selecting a terminal to play the role of a registrar or an enrollee, according to an exemplary embodiment. Referring to FIG. 4, in Operation 410, each terminal generates a role selection table 170 including a terminal identifier and WPS capability information, which are interchanged with other terminals.

In Operations 415 through 450, a terminal selects a role as a registrar or an enrollee based on the interchanged terminal identifier and the interchanged WPS capability information of the wireless ad-hoc network.

In Operation 415, the terminal determines whether its own WPS capability information includes identification information regarding only serving as an enrollee, from among the roles of enrollee and registrar. If the WPS capability information of the terminal includes identification information regarding only serving as an enrollee, from among the roles of enrollee and registrar, the operation proceeds to Operation 420, and if not, the operation proceeds to Operation 415.

In Operation 420, the terminal selects its own role as an enrollee.

Operation 425 refers to a case where the WPS capability information of the terminal does not include identification information regarding only serving as an enrollee, from among the roles of enrollee and registrar. In Operation 425, the terminal determines whether its own WPS capability information includes identification information regarding only serving as a registrar, from among the roles of enrollee and registrar. If the WPS capability information of the terminal includes identification information regarding only serving as a registrar, from among the roles of enrollee and registrar, the operation proceeds to Operation 430, and if not, the operation proceeds to Operation 450.

Operation 430 refers to a case where the WPS capability information of the terminal does not include identification information regarding only serving as a registrar, from among the roles of enrollee and registrar. In Operation 430, the role selection table 170 is searched to determine whether WPS capability information of other terminals of the wireless ad-hoc network includes identification information regarding only serving as a registrar, from among the roles of enrollee and registrar. If there are other terminals having the WPS capability information including identification information regarding only serving as a registrar, from among the roles of enrollee and registrar, the operation proceeds to Operation 435, and if not, the operation proceeds to Operation 440.

Operation 440 refers to a case where there are no terminals having WPS capability information including identification information regarding only serving as a registrar, from among the roles of enrollee and registrar. In Operation 440, the terminal selects its own role as a registrar.

Operation 435 refers to a case where there are other terminals having WPS capability information including identification information regarding only serving as a registrar, from among the roles of enrollee and registrar. In Operation 435, the terminal compares terminal identifiers in the role selection table 170 with each other based on a predetermined determination criterion. For example, the terminal aligns the terminal identifiers in the role selection table 170 in an ascending or descending order and determines whether its own terminal identifier has a highest priority. The terminal identifier may be a MAC address of the terminal. Thus, the terminal aligns its own MAC address and MAC addresses of other terminals and compares the aligned addresses. As a result of the alignment, if the terminal identifier of the terminal has the highest priority, the operation proceeds to Operation 440, and if not, the operation proceeds to Operation 445.

Operation 440 refers to a case where the terminal identifier of the terminal has the highest priority as a result of alignment. In Operation 440, the terminal selects its own role to be that of a registrar.

Operation 445 refers to a case where the terminal identifier of the terminal does not have the highest priority as a result of alignment. In Operation 445, the terminal is not activated.

Operation 450 refers to a case where WPS capability information of the terminal includes identification information regarding serving as both an enrollee and a registrar. In Operation 450, the terminal compares terminal identifiers in the role selection table 170 based on a predetermined determination criterion. For example, the terminal aligns the terminal identifiers in the role selection table 170 in an ascending or descending order and determines whether its own terminal identifier has the highest priority. The terminal identifier may be a MAC address of the terminal. Thus, the terminal aligns its own MAC address and MAC addresses of other terminals and compares the aligned addresses. As a result of the alignment, when the terminal identifier has the highest priority, the operation proceeds to Operation 440, and the terminal is selected to play the role of a registrar, and if not, the operation proceeds to Operation 420, and the terminal is selected to play the role of an enrollee.

Figure 5:
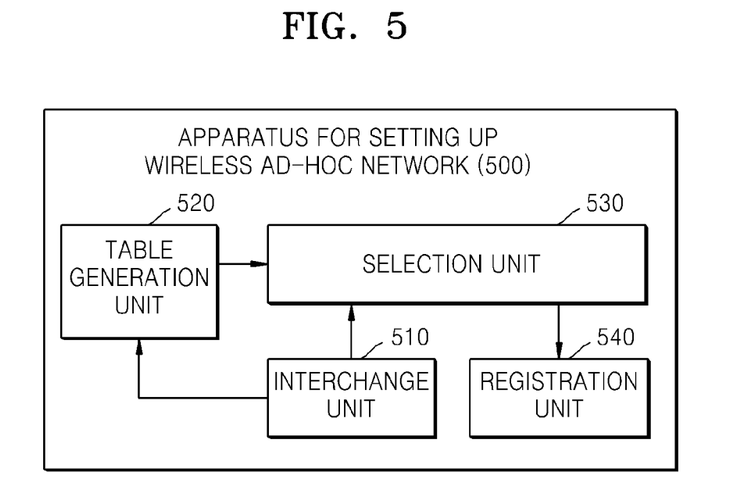
FIG. 5 is a block diagram illustrating a schematic structure of an apparatus for setting up a wireless ad-hoc network, according to an exemplary embodiment.

FIG. 5 is a block diagram illustrating a schematic structure of an apparatus for setting up a wireless ad-hoc network 500, according to an exemplary embodiment. Referring to FIG. 5, the apparatus for setting up a wireless ad-hoc network 500 includes an interchange unit 510, a table generation unit 520, a selection unit 530, and a registration unit 540.

The interchange unit 510 interchanges a search frame including WPS capability information of a terminal including the apparatus 500 with other terminals of a wireless ad-hoc network. The search frame may include a terminal identifier as well as the WPS capability information. For example, the terminal identifier may be a MAC address of the terminal. Also, the search frame may be a probe request frame.

The table generation unit 520 generates a role selection table including the terminal identifier and the WPS capability information, which are interchanged with other terminals.

The selection unit 530 selects the terminal to play the role of a registrar or an enrollee based on the role selection table including the terminal identifier and the WPS capability information.

After a registrar has been selected in the ad-hoc network, the registration unit 540 provides or receives a credential depending on the selected role of the terminal. A credential is given by the terminal selected as a registrar to the registration unit 540 of the terminal serving as an enrollee and thus, the terminal may participate in the network. In this case, the registration unit 540 receives credentials from one or more other terminals of the wireless ad-hoc network, which are selected as registrars, by using an EAP.

The registration unit 540 of the terminal serving as a registrar transmits the credentials to other terminals of the wireless ad-hoc network selected as an enrollee by using the EAP.

A security session in which the terminal serving as an enrollee receives a credential from the terminal serving as a registrar, may include eight EAP messages.

Figure 6:
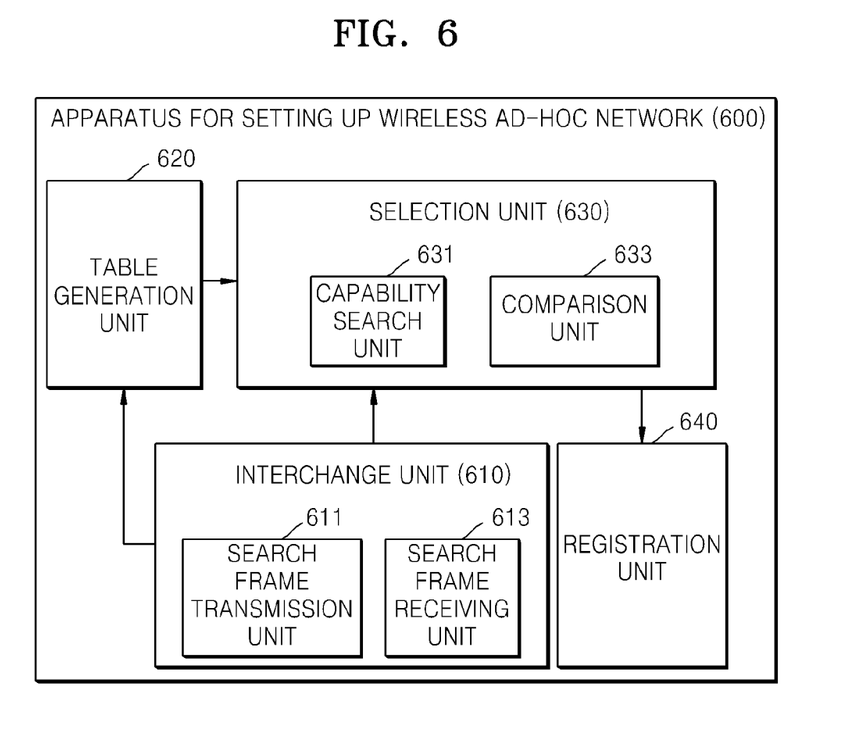
FIG. 6 is a block diagram illustrating a detailed structure of an apparatus for setting up a wireless ad-hoc network, according to an exemplary embodiment.

FIG. 6 is a block diagram illustrating a detailed structure of an apparatus for setting up a wireless ad-hoc network 600, according to an exemplary embodiment. Referring to FIG. 6, the apparatus for setting up a wireless ad-hoc network 600 includes an interchange unit 610, a table generation unit 620, a selection unit 630, and a registration unit 640. The interchange unit 610 includes a search frame transmission unit 611 and a search frame receiving unit 613, and the selection unit 630 includes a capability search unit 631 and a comparison unit 633.

The interchange unit 610 interchanges a search frame including WPS capability information of a terminal including the apparatus 600 with other terminals of the wireless ad-hoc network. The search frame may include a terminal identifier as well as the WPS capability information. For example, the terminal identifier may be a MAC address of the terminal. Also, the search frame may be a probe request frame.

The search frame transmission unit 611 transmits the search frame including the terminal identifier and the WPS capability information to other terminals of the wireless ad-hoc network. The search frame receiving unit 613 receives search frames from other terminals of the wireless ad-hoc network.

The table generation unit 620 generates a role selection table including the terminal identifier and the WPS capability information, which are interchanged with other terminals.

The selection unit 630 selects the terminal to play the role of a registrar or an enrollee based on the role selection table including the terminal identifier and the WPS capability information. When the WPS capability information includes identification information regarding only serving as an enrollee, from among the roles of enrollee and registrar, the selection unit 630 selects the terminal to play the role of an enrollee.

When the WPS capability information of the terminal includes identification information regarding only serving as a registrar, from among the roles of enrollee and registrar, the capability search unit 631 searches to determine whether the WPS capability information of other terminals of the wireless ad-hoc network includes identification information regarding only serving as a registrar from the role selection table.

As a result of the searching, when there are other terminals including identification information regarding only serving as a registrar, from among the roles of enrollee and registrar, the comparison unit 633 compares terminal identifiers in the role selection table based on a predetermined determination criterion. For example, the comparison unit 633 aligns the terminal identifiers in the role selection table in an ascending or descending order and determines whether its own terminal identifier has a highest priority. The terminal identifier may be a MAC address of the terminal. In this case, the comparison unit 633 aligns its own MAC address and MAC addresses of other terminals and compares the aligned addresses. As a result of the alignment, when the terminal identifier does have the highest priority, the selection unit 630 selects the terminal to play the role of a registrar. Conversely, when the terminal identifier does not have the highest priority, the selection unit 630 does not activate the terminal.

As a result of the searching, when there are no other terminals having WPS capability information including identification information regarding only serving as a registrar, from among the roles of enrollee and registrar, the selection unit 630 selects the terminal to play the role of a registrar.

When the WPS capability information of the terminal includes identification information regarding serving as both an enrollee and a registrar, the comparison unit 633 compares terminal identifiers in the role selection table based on a predetermined determination criterion. For example, the comparison unit 633 aligns the terminal identifiers in the role selection table in an ascending or descending order and determines whether its own terminal identifier has the highest priority. The terminal identifier may be a MAC address of the terminal. Thus, the comparison unit 633 aligns its own MAC address and MAC addresses of other terminals and compares the aligned addresses. As a result of the alignment, when the terminal identifier has the highest priority, the selection unit 630 selects the terminal to play the role of a registrar. Conversely, when the terminal identifier does not have the highest priority, the selection unit 630 selects the terminal to play the role of an enrollee.

After a registrar has been selected in the ad-hoc network, the registration unit 640 provides or receives a credential depending on the selected role of the terminal. A credential is given by the terminal selected as a registrar to the registration unit 640 of the terminal serving as an enrollee and thus, the terminal may participate in the network. In this case, the registration unit 640 receives credentials from one or more other terminals of the wireless ad-hoc network, which are selected as registrars, by using an EAP.

The registration unit 640 of the terminal serving as a registrar transmits the credentials to other terminals of the wireless ad-hoc network selected as an enrollee by using the EAP.

A security session in which the terminal for serving as an enrollee receives a credential from the terminal for serving as a registrar, may include eight EAP messages.

Exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, exemplary embodiments may be written as computer programs transmitted over a computer-readable transmission medium, such as a carrier wave, and received and implemented in general-use or special-purpose digital computers that execute the programs.

For example, an apparatus for setting up a wireless ad-hoc network according to an exemplary embodiment may include a bus coupled to units of the apparatus 500 illustrated in FIG. 5 or the apparatus 600 illustrated in FIG. 6, at least one processor coupled to the bus, and a memory coupled to the bus so as to store commands, a received message or a generated message and coupled to at least one processor for executing commands described above.

While exemplary embodiments been particularly shown and described with reference to the drawings, it will be understood by those of ordinary skill in the art that various changes in form and details may be made therein without departing from the spirit and scope of the present inventive concept as defined by the following claims.

The invention claimed is:

1. A method of setting up a wireless ad-hoc network, the method comprising:

interchanging, at a terminal, a terminal identifier and Wi-Fi protected setup (WPS) capability information with another terminal of the wireless ad-hoc network;

selecting, at the terminal, a role of the terminal as a registrar or an enrollee based on the interchanged terminal identifier and the interchanged WPS capability information of the wireless ad-hoc network; and optionally registering in the registrar based on the selected role, wherein the interchanged WPS capability information of the terminal comprises an information field for informing the other terminal of all WPS roles that the terminal is capable of serving as the registrar or the enrollee, and wherein when the terminal is capable of serving as either of the registrar and the enrollee, the information field of the WPS capability information of the terminal indicates that the terminal is capable of serving as the registrar and capable of serving as the enrollee.

2. The method of claim 1, wherein the interchanging the terminal identifier and the Wi-Fi protected setup (WPS) capability information with the other terminal of the wireless ad-hoc network comprises:

transmitting a first search frame comprising the terminal identifier and the WPS capability information of the terminal to the other terminal of the wireless ad-hoc network; and receiving a second search frame comprising the terminal identifier and the WPS capability information of the other terminal from the other terminal of the wireless ad-hoc network.

3. The method of claim 2, wherein the first and second search frames are probe request frames.

4. The method of claim 1, wherein the terminal identifier is a media access control (MAC) address of the terminal.

5. The method of claim 1, wherein the WPS capability information comprises at least one of identification information regarding only serving as the registrar from among roles of the registrar and the enrollee, identification information regarding only serving as the enrollee from among roles of the registrar and the enrollee, and identification information regarding serving as both the registrar and the enrollee.

6. The method of claim 5, further comprising generating a role selection table comprising the terminal identifier and the WPS capability information of the terminal and the other terminal, which are interchanged with the other terminal of the wireless ad-hoc network.

7. The method of claim 6, wherein when the WPS capability information of the terminal comprises the identification information regarding only serving as the enrollee, the selecting the role as the registrar or the enrollee comprises selecting the terminal to have the role of the enrollee.

8. The method of claim 6, wherein when the WPS capability information of the terminal comprises the identification information regarding only serving as the registrar, the selecting the role as the registrar or the enrollee comprises:

searching the role selection table to determine whether the WPS capability information of the other terminal of the wireless ad-hoc network comprises identification information regarding only serving as a registrar;

as a result of the searching, when the WPS capability information of the other terminal comprises identification information regarding only serving as the registrar, comparing the terminal identifiers of the terminal and the other terminal with each other in the role selection table based on a predetermined determination criterion; and optionally selecting the terminal to have the role of the registrar based on the comparing.

9. The method of claim 8, wherein, as a result of the searching, when there are no other terminals of the wireless ad-hoc network comprising WPS capability information comprising identification information regarding only serving as a registrar, the selecting the role as the registrar or the enrollee further comprises selecting the terminal to have the role of the registrar.

10. The method of claim 6, wherein when the WPS capability information of the terminal comprises the identification information regarding serving as both the registrar and the enrollee, the selecting the role as the registrar or the enrollee comprises:

comparing the terminal identifiers of the terminal and the other terminal with each other in the role selection table based on a predetermined determination criterion; and optionally selecting the terminal to have the role of the registrar based on the comparing.

11. The method of claim 8, wherein:

the comparing the terminal identifiers based on the predetermined determination criterion comprises aligning terminal identifiers of terminals of the wireless ad-hoc network in an ascending or descending order and determining whether the terminal identifier of the terminal has a highest priority from the aligned terminal identifiers; and the optionally selecting the terminal to have the role of the registrar comprises, as a result of the determining, when the terminal identifier of the terminal has the highest priority, selecting the terminal to have the role of the registrar and when the terminal identifier of the terminal does not have the highest priority, selecting the terminal to have the role of the enrollee.

12. The method of claim 1, wherein the optionally registering in the registrar based on the selected role comprises:

when the terminal is selected to have the role of the enrollee, receiving a credential from the other terminal of the wireless ad-hoc network selected as a registrar by using an extensible authentication protocol (EAP); and when the terminal is selected to have the role of the registrar, transmitting a credential to the other terminal of the wireless ad-hoc network selected as an enrollee by using the EAP.

13. An apparatus of a terminal for setting up a wireless ad-hoc network, the apparatus comprising:

an interchange unit which interchanges a terminal identifier and Wi-Fi protected setup (WPS) capability information with another terminal of the wireless ad-hoc network;

a selection unit which selects a role of the terminal as a registrar or an enrollee based on the interchanged terminal identifier and the interchanged WPS capability information of the wireless ad-hoc network; and a registration unit which optionally registers in the registrar based on the selected role, wherein the interchanged WPS capability information of the terminal comprises an information field for informing the other terminal of all WPS roles that the terminal is capable of serving as the registrar or the enrollee, and wherein when the terminal is capable of serving as either of the registrar and the enrollee, the information field of the WPS capability information of the terminal indicates that the terminal is capable of serving as the registrar and capable of serving as the enrollee.

14. The apparatus of claim 13, wherein the interchange unit comprises:

a search frame transmission unit which transmits a first search frame comprising the terminal identifier and the WPS capability information of the terminal to the other terminal of the wireless ad-hoc network; and a search frame receiving unit which receives a second search frame comprising the terminal identifier and the WPS capability information from the other terminal of the wireless ad-hoc network.

15. The apparatus of claim 14, wherein the first and second search frames are probe request frames.

16. The apparatus of claim 13, wherein the terminal identifier is a media access control (MAC) address of the terminal.

17. The apparatus of claim 13, wherein the WPS capability information comprises at least one of identification information regarding only serving as the registrar from among roles of the registrar and the enrollee, identification information regarding only serving as the enrollee from among roles of the registrar and the enrollee, and identification information regarding serving as both the registrar and the enrollee.

18. The apparatus of claim 17, further comprising a table generation unit which generates a role selection table comprising the terminal identifier and the WPS capability information of the terminal and the other terminal, which are interchanged with the other terminal of the wireless ad-hoc network.

19. The apparatus of claim 18, wherein when the WPS capability information of the terminal comprises the identification information regarding only serving as the enrollee, the selection unit selects the terminal to have the role of the enrollee.

20. The apparatus of claim 18, wherein when the WPS capability information of the terminal comprises the identification information regarding only serving as the registrar, the selection unit comprises:

a capability search unit which searches the role selection table to determine whether the WPS capability information of the other terminal of the wireless ad-hoc network comprises identification information regarding only serving as a registrar; and a comparison unit which, as a result of the searching, when the WPS capability information of the other table comprises identification information regarding only serving as the registrar, compares the terminal identifiers of the terminal and the other terminal with each other in the role selection table based on a predetermined determination criterion, and the selection unit optionally selects the terminal to have the role of the registrar based on the comparing.

21. The apparatus of claim 20, wherein, as a result of the searching, when there are no other terminals of the ad-hoc network comprising WPS capability information comprising identification information regarding only serving as a registrar, the selection unit selects the terminal to have the role of the registrar.

22. The apparatus of claim 18, wherein, when the WPS capability information of the terminal comprises the identification information regarding serving as both the registrar and the enrollee, the selection unit comprises:

a comparison unit which compares the terminal identifiers of the terminal and the other terminal with each other in the role selection table based on a predetermined determination criterion, and the selection unit optionally selects the terminal to have the role of the registrar based on the comparing.

23. The apparatus of claim 20, wherein:

the comparison unit aligns terminal identifiers of terminals of the wireless ad-hoc network in an ascending or descending order and determines whether the terminal identifier of the terminal has a highest priority from the aligned terminal identifiers; and the selection unit, as a result of the determining, when the terminal identifier of the terminal has the highest priority, selects the terminal to have the role of the registrar and when the terminal identifier of the terminal does not have the highest priority, selects the terminal to have the role of the enrollee.

24. The apparatus of claim 13, wherein:

when the terminal is selected to have the role of the enrollee, the registration unit receives a credential from the other terminal of the wireless ad-hoc network selected as a registrar by using an extensible authentication protocol (EAP); and when the terminal is selected to have the role of the registrar, the registration unit transmits a credential to the other terminal of the wireless ad-hoc network selected as an enrollee by using the EAP.

25. A non-transitory computer readable recording medium having recorded thereon a program for executing the method of claim 1.

26. The method of claim 1, wherein the selecting the role as the registrar or the enrollee comprises selecting, at the other terminal, a role of the other terminal as a registrar or an enrollee based on the interchanged terminal identifier and the interchanged WPS capability information of the wireless ad-hoc network.

27. The method of claim 10, wherein:

the comparing the terminal identifiers based on the predetermined determination criterion comprises aligning terminal identifiers of terminals of the wireless ad-hoc network in an ascending or descending order and determining whether the terminal identifier of the terminal has a highest priority from the aligned terminal identifiers; and the optionally selecting the terminal to have the role of the registrar comprises, as a result of the determining, when the terminal identifier of the terminal has the highest priority, selecting the terminal to have the role of the registrar and when the terminal identifier of the terminal does not have the highest priority, selecting the terminal to have the role of the enrollee.

28. The apparatus of claim 22, wherein:

the comparison unit aligns terminal identifiers of terminals of the wireless ad-hoc network in an ascending or descending order and determines whether the terminal identifier of the terminal has a highest priority from the aligned terminal identifiers; and the selection unit, as a result of the determining, when the terminal identifier of the terminal has the highest priority, selects the terminal to have the role of the registrar and when the terminal identifier of the terminal does not have the highest priority, selects the terminal to have the role of the enrollee.

29. A method of setting up a wireless ad-hoc network, the method comprising:

interchanging, at a terminal, Wi-Fi protected setup (WPS) capability information with another terminal of the wireless ad-hoc network; and selecting, at the terminal, a role of the terminal as a registrar or an enrollee based on the interchanged WPS capability information of the wireless ad-hoc network, wherein the interchanged WPS capability information of the terminal comprises an information field for informing the other terminal of all WPS roles that the terminal is capable of serving as the registrar or the enrollee, and wherein when the terminal is capable of serving as either of the registrar and the enrollee, the information field of the WPS capability information of the terminal indicates that the terminal is capable of serving as the registrar and capable of serving as the enrollee.

30. A non-transitory computer readable recording medium having recorded thereon a program for executing the method of claim 29.

31. A system for setting up a wireless ad-hoc network, the system comprising:

a first terminal of the wireless ad-hoc network, the first terminal comprising:

an interchange unit which interchanges Wi-Fi protected setup (WPS) capability information with a second terminal of the wireless ad-hoc network, and a selection unit which selects a role of the first terminal as a registrar based on the interchanged WPS capability information of the wireless ad-hoc network; and the second terminal comprising:

an interchange unit which interchanges the Wi-Fi protected setup (WPS) capability information with the first terminal of the wireless ad-hoc network, and a selection unit which selects a role of the second terminal as an enrollee based on the interchanged WPS capability information of the wireless ad-hoc network, wherein the interchanged WPS capability information of the first terminal comprises an information field for informing the second terminal of all WPS roles that the first terminal is capable of serving as the registrar or the enrollee, and the interchanged WPS capability information of the second terminal comprises an information field for informing the first terminal of all WPS roles that the second terminal is capable of serving as the registrar or the enrollee, and wherein when a terminal is capable of serving as either of the registrar and the enrollee, the information field of the WPS capability information of the terminal indicates that the terminal is capable of serving as the registrar and capable of serving as the enrollee.

* * * * *